United States Patent
Zinin

(10) Patent No.: US 9,609,486 B2
(45) Date of Patent: Mar. 28, 2017

(54) LOCATION AND TIME-AWARE SYSTEMS AND METHODS FOR MOBILE USER CONTEXT DETECTION

(71) Applicant: Cinarra Systems Pte. Ltd., Singapore (SG)

(72) Inventor: Alexey Dmitriyevich Zinin, Santa Clara, CA (US)

(73) Assignee: Cinarra Systems, Singapore (SG)

( * ) Notice: Subject to any disclaimer, the term of this patent is extended or adjusted under 35 U.S.C. 154(b) by 75 days.

(21) Appl. No.: 14/146,563

(22) Filed: Jan. 2, 2014

(65) Prior Publication Data

US 2014/0187269 A1    Jul. 3, 2014

Related U.S. Application Data

(60) Provisional application No. 61/748,700, filed on Jan. 3, 2013.

(51) Int. Cl.
    *H04W 24/00* (2009.01)
    *H04W 4/04* (2009.01)
    *H04W 4/20* (2009.01)
    *H04M 1/725* (2006.01)

(52) U.S. Cl.
    CPC ......... *H04W 4/04* (2013.01); *H04M 1/72572* (2013.01); *H04M 1/72566* (2013.01); *H04W 4/206* (2013.01)

(58) Field of Classification Search
    CPC ......... H04W 4/02; H04W 4/04; H04W 4/206; H04L 29/08657; H04M 1/72572; H04M 1/72566

USPC ........................................... 455/456.3
    See application file for complete search history.

(56) References Cited

U.S. PATENT DOCUMENTS

| | | | |
|---|---|---|---|
| 5,664,948 A | 9/1997 | Dimitriadis et al. | |
| 7,359,716 B2 | 4/2008 | Rowitch et al. | |
| 8,781,475 B1 * | 7/2014 | McKeeman | H04W 36/32 370/331 |
| 2002/0095333 A1 | 7/2002 | Jokinen et al. | |
| 2002/0111154 A1 * | 8/2002 | Eldering | H04M 3/4872 455/414.1 |

(Continued)

FOREIGN PATENT DOCUMENTS

| EP | 1670268 A1 | 6/2006 |
|---|---|---|
| WO | WO-2009036497 A1 | 3/2009 |

OTHER PUBLICATIONS

U.S. Appl. No. 14/146,569, Methods and Systems for Dynamic Detection of Consumer Venue Walk-Ins, filed Jan. 2, 2014.

(Continued)

*Primary Examiner* — Amancio Gonzalez
(74) *Attorney, Agent, or Firm* — Goodwin Procter LLP

(57) ABSTRACT

Methods and systems for providing situational user contexts to mobile applications, allowing for delivery of the relevant content without exposing mobile users' locations and other personal data. A plurality of space-time contexts (STCs) are stored in computer memory, with each STC representing a situational environment as a function of location and time. A mobile user device is associated with at least one of the STCs based on, for example, the location of the device and the current time. The associated STCs are provided to an application interested in delivering context-specific data to the user of the mobile user device.

20 Claims, 2 Drawing Sheets

(56) References Cited

U.S. PATENT DOCUMENTS

| | | | |
|---|---|---|---|
| 2002/0116711 A1* | 8/2002 | Courtney | H04N 21/4147 |
| | | | 725/50 |
| 2002/0164977 A1 | 11/2002 | Link, II et al. | |
| 2003/0198346 A1 | 10/2003 | Meifu et al. | |
| 2004/0166878 A1* | 8/2004 | Erskine | H04W 48/04 |
| | | | 455/456.1 |
| 2004/0209602 A1 | 10/2004 | Joyce et al. | |
| 2005/0221843 A1 | 10/2005 | Friedman et al. | |
| 2005/0227705 A1 | 10/2005 | Rousu et al. | |
| 2005/0227711 A1 | 10/2005 | Orwant et al. | |
| 2006/0058037 A1 | 3/2006 | Kenyon | |
| 2007/0270133 A1 | 11/2007 | Hampel et al. | |
| 2007/0270160 A1 | 11/2007 | Hampel et al. | |
| 2007/0270161 A1 | 11/2007 | Hampel et al. | |
| 2007/0270162 A1 | 11/2007 | Hampel et al. | |
| 2007/0270166 A1 | 11/2007 | Hampel et al. | |
| 2008/0182592 A1 | 7/2008 | Cha et al. | |
| 2009/0005968 A1* | 1/2009 | Vengroff | G06F 17/3087 |
| | | | 701/425 |
| 2009/0131080 A1 | 5/2009 | Nadler et al. | |
| 2010/0217663 A1 | 8/2010 | Ramer et al. | |
| 2011/0105097 A1 | 5/2011 | Tadayon et al. | |
| 2011/0207440 A1* | 8/2011 | Ruuspakka | H04W 4/08 |
| | | | 455/414.1 |
| 2014/0032572 A1* | 1/2014 | Eustice | G06F 17/2785 |
| | | | 707/748 |
| 2014/0335823 A1* | 11/2014 | Heredia | H04L 12/5895 |
| | | | 455/411 |
| 2015/0120453 A1* | 4/2015 | Lee | G06Q 30/0267 |
| | | | 705/14.58 |

OTHER PUBLICATIONS

Figuera, et al., (2011) "TIme-Space Sampling and Mobile Device Calibration for WiFi Indoor Location Systems", *IEEE Transactions on Mobile Computing*, vol. 10, No. 7, pp. 913-926.

Gansemer, et al., (2010) "RSSI-based Euclidean Distance algorithm for indoor positioning adapted for the use in dynamically changing WLAN environments and multi-level buidlings", Indoor Positioning and Indoor Navigation, *IEEE*, pp. 1-6.

Gomez-Barroso, Jose L., et al., (2010) "Prospects of Mobile Search," Institute for Prospective Technological Studies, *JRC Scientific and Technical Reports*, Retrieved from the web on Jun. 30, 2014: http://ftp.jrc.es/EURdoc/JRC56100.pdf, 152 pages.

International Search Report and Written Opinion for International Patent Application No. PCT/US2014/010094 dated Apr. 30, 2014, (10 pages).

Ivanov, et al., (2008) "Automatic WLAN localization for industrial automation", Factory Communication Systems, *IEEE*, pp. 93-96.

Namiot, et al., (2012) "Proximity as a service", Future Internet Communications, *IEEE*, pp. 199-205.

International Search Report and Written Opinion for International Patent Application No. PCT/US2014/010093 dated Sep. 15, 2014, (7 pages).

\* cited by examiner

LOCATION AND TIME-AWARE SYSTEMS AND METHODS FOR MOBILE USER CONTEXT DETECTION

CROSS-REFERENCE TO RELATED APPLICATION

This application claims priority to and the benefit of U.S. Provisional Patent Application No. 61/748,700, filed on Jan. 3, 2013, and entitled "Location and Time-Aware Systems and Methods for Mobile User Context Detection," the entirety of which is incorporated herein by reference.

TECHNICAL FIELD

The present disclosure relates generally to location-based services and, more specifically, to systems and methods for providing scalable-location and time-aware determination of mobile users' immediate situational contexts for a variety of mobile applications, including advertising.

BACKGROUND

In recent years the number of mobile computing devices has increased dramatically, creating the need for more advanced mobile and wireless services. Mobile email, walkie-talkie services, multi-player gaming and call following are just a few examples of new applications that are emerging on mobile devices. In addition, mobile users are beginning to demand applications that not only utilize their current location but also share that location information with others. For example, parents wish to keep track of their children, supervisors need to track the location of their companies' delivery vehicles, and business travelers desire to search for nearby pharmacies to pick up prescriptions. All of these examples require the individual to know their own location or that of someone else.

Currently available methods for utilizing consumer location on mobile devices can be classified into three categories. The first category involves utilizing precise coordinates. Applications can acquire very accurate location information using the device's GPS receiver and motion sensors, such as for providing mobile map and driving directions functionality. The second category involves utilizing geographical proximity. In this case, applications can perform certain actions upon detecting users' proximity towards a specific geo location. This can include, for example, applications that provide coupons and sales promotion material distribution, online check-in, and mobile advertising functionality. The third category involves utilizing geo-fencing, that is, applications that detect whether a user is within a certain geographical area as described by a virtual "fence" defined by a user. Examples include mobile asset tracking, child safety applications, mobile advertising, and sales promotion.

A wide variety of different types of wireless communication systems are known. Also, numerous techniques have been developed that deliver advertising or other types of messages to mobile user devices based on the current locations of those devices. Thus, if a given mobile user device is determined to be in close proximity to a particular retail establishment, an advertisement or other message associated with that establishment may be delivered to the mobile user device. Unfortunately, conventional wireless communication systems suffer from a number of significant drawbacks. For example, conventional systems are typically configured in a manner that can lead to excessive location queries or other types of location-related communications between the base stations and the mobile user devices, thereby undermining the ability of the systems to support their primary voice and data traffic functionality.

"Fence crossing" generally refers to determining when a given mobile user has crossed a designated boundary. A fence-crossing event may be used, for example, to control the delivery of a particular message to a given mobile user device, or to control the provision of other types of location-based services. Conventional techniques for dealing with fence crossings fail to provide optimal performance in delivery of location-based services, particularly in mass market, high-volume applications, which can involve many mobile users and many fences per user. For example, conventional techniques often require excessive messaging over an air interface of the wireless network, thereby consuming system resources and adversely impacting system performance. Also, such messaging can result in increased power consumption in the mobile user device, thereby adversely impacting battery life. Accordingly, new techniques are needed that can further improve the delivery of location-based services through enhanced processing of fence-crossing information.

Advertisers and advertising providers attempt to maximize the effectiveness of advertising by targeting certain marketing materials at consumers based on a number of criterion, including time of day, location within an urban environment (e.g., proximity to a particular vendor) and also based on demographics of the particular consumers likely to view the advertising. This kind of targeting advertising is known to substantially increase sales revenues due to a significant increase in advertising value. Typically, targeted advertising is accomplished by associating advertising with advertising outlets in particular urban neighborhoods or locations, such as by mounting advertising posters in certain neighborhoods, or along certain traffic routes and by providing advertising in vehicles that only run at certain times of the day (e.g., rush hour overflow buses).

Currently available methods exhibit a number of limitations, including but not limited to the following:

(i) Limited scalability: geo-proximity areas and geo-fences vary significantly depending on the user and application, and normally include substantial provisioning and maintenance overhead. As an example, a large brand or an advertising agency might have to configure millions of proximity locations or fences in order to capture all locations of a specific category (e.g., restaurant, or residential) in a given country.

(ii) Inability to capture temporal differences: the same set of locations may attract a substantially different set of users depending on day or week, time of day, and local events. Location alone, without the time dimension and understanding of the local scene, has limited applicability and value for businesses.

(iii) Potential disclosure of the mobile user location to third parties: proximity and geo-fencing techniques have the risk of indirect disclosure of the user location to parties such as advertisers and stores. This may cause regulatory concerns by the mobile operators or limited subscriber uptake in the case of direct consumer consent acquisition.

In general, one can distinguish three types of contexts associated with mobile users that represent substantial interest to other businesses (such as retail owners, advertisers, application developers and content owners): (i) internal personal context reflecting a person's thoughts, desires and the like, which is normally expressed by the individuals while performing web search (e.g., Google search) or participating in social networking (e.g., Facebook or Twitter); (ii) the application context, reflecting the subject area of the mobile application being used by the individual, e.g., news, stock market, media, social networking, games, etc.; and (iii) the situational context, reflecting spatial and temporal placement of an individual, e.g., office time, business lunch, family dinner, travel, and so on.

Existing mobile information systems tend to focus exclusively on user's location, their search and social network activities (personal context) and applications themselves (application context), providing little appreciation of a mobile user's overall condition or context. Because of the small screens and keyboards associated with these mobile devices, it is much harder for mobile users to express their information needs and to locate relevant search results on mobile devices. In particular, when web search approaches are applied to mobile platforms, usability and mobile user experience become significant issues. Because of these problems, it is clear that mobile search as a direct translation of conventional web approaches will have limited success in the mobile domain.

The application context itself also exhibits limited applicability. Smartphone users reading news in a business meeting, or playing games on a train to work or in a bar after work, is a common phenomenon. The fact that a user is utilizing a particular application in a given moment in time does not necessarily represent the significance of the application's subject area to that person overall or at a particular point in time. Of the three mobile user contexts described above, the situational context has been the least explored, reducing to mostly location-only techniques, which do not capture full complexity and level of relevance from the consumer's perspective.

What is needed, therefore, are improved techniques that overcome the limitations of existing approaches through a user-based situational context that is defined as a function of space and time.

SUMMARY

An object of the present disclosure is to provide systems and methods that enable translation of complex information about a user's immediate location, time, and surrounding "points of interest" (e.g., businesses, shopping centers, schools, etc.) into a simple value representing the user's situational context, and that then allow third-party applications (e.g., mobile advertising, social networks, sales promotions, news, etc.) to use the user's situational knowledge to deliver relevant content without exposing the user's location and hence violating their privacy.

Another object of the present disclosure is to provide systems and methods for provisioning the system's geo database with polygons representing location areas of different precision (e.g., buildings, city blocks, city districts, states, countries, and so on).

A further object of the present disclosure is to provide systems and methods for provisioning the system with a set of descriptors, each representing a particular space-time context (STC) identified by a specific STC ID.

Another object of the present disclosure is to provide systems and methods for provisioning a geo database with a time-indexed data structure (STC Vector) to immediately identify the context(s) associated with each polygon at a particular point in time.

Still another object of the present disclosure is to provide systems and methods that, if necessary for real-time operations, represent a resulting database in an in-memory data structure optimized for real time operations.

Yet another object of the present disclosure is to provide systems and methods for identifying a user's current location including, but not limited to, (a) integration with a mobile operator's network, and (b) receiving a user location directly from a mobile user device equipped with a GPS receiver.

Another object of the present disclosure is to provide systems and methods for performing search operations within a geo database (if necessary, in its in-memory representation) to locate best matching geo polygons based on consumer location information, and automatically adjusting the results of the search operation according to the precision of the available user location information.

Still another object of the present disclosure is to provide systems and methods that use date and time information (e.g., day-of-week and time-of-day) to index within an STC Vector and identify a set of active STCs associated with a user.

Yet another object of the present disclosure is to provide systems and methods that select a limited number of active STCs according to arbitrary (application-specific) criteria.

A further object of the present disclosure is to provide systems and methods that inform applications about the STCs that a user is associated with.

Accordingly, in one aspect, a computer-implemented method includes storing, in computer memory, a plurality of space-time contexts (STCs). Each STC includes a situational environment as a function of location and time. A mobile user device is associated with at least one of the STCs, and the associated STCs are provided to an application.

In various implementations, the method includes one or more of the following features. The association can be based on a current location of the mobile user device and/or a current time. A plurality of polygons can be stored in the computer memory, with each polygon representing at least one of a geographical entity and a geographical area.

In another implementation, the association step includes receiving a location of the mobile user device, identifying at least one of the polygons containing at least a portion of the location of the mobile user device, and selecting, based on the identified polygon and a time associated with the mobile user device, at least one of the STCs to be associated with the mobile user device. The location of the mobile user device can be obtained from a mobile carrier network.

In further implementations, the method includes one or more of the following features. A request for an STC associated with the mobile user device can be received from the application. A request to be provided with a notification upon the mobile user device becoming associated with at least one of the STCs can be received from the application. A plurality of STC descriptors can be stored in the computer memory, with each STC descriptor including an instance of an STC associated with at least one of the polygons. The STC descriptors can be created and updated based on statistical data reflecting mobile user activity: (a) within specific geographical areas, and (b) during specific times. An advertisement to be served to the mobile user device can be selected based on the associated STC. A hierarchical structure of the STCs can be stored in the computer memory, with increasing levels of the hierarchical structure representing increasing levels of specificity of the STCs.

In another aspect, a system includes one or more computers programmed to perform operations including storing, in computer memory, a plurality of space-time contexts (STCs). Each STC includes a situational environment as a function of location and time. A mobile user device is associated with at least one of the STCs, and the associated STCs are provided to an application.

In various implementations, the system includes one or more of the following features. The association can be based on a current location of the mobile user device and/or a current time. A plurality of polygons can be stored in the computer memory, with each polygon representing at least one of a geographical entity and a geographical area.

In another implementation, the association operation includes receiving a location of the mobile user device, identifying at least one of the polygons containing at least a portion of the location of the mobile user device, and selecting, based on the identified polygon and a time associated with the mobile user device, at least one of the STCs to be associated with the mobile user device. The location of the mobile user device can be obtained from a mobile carrier network.

In further implementations, the system includes one or more of the following features. A request for an STC associated with the mobile user device can be received from the application. A request to be provided with a notification upon the mobile user device becoming associated with at least one of the STCs can be received from the application. A plurality of STC descriptors can be stored in the computer memory, with each STC descriptor including an instance of an STC associated with at least one of the polygons. The STC descriptors can be created and updated based on statistical data reflecting mobile user activity: (a) within specific geographical areas, and (b) during specific times. An advertisement to be served to the mobile user device can be selected based on the associated STC. A hierarchical structure of the STCs can be stored in the computer memory, with increasing levels of the hierarchical structure representing increasing levels of specificity of the STCs.

Other aspects and advantages of the invention will become apparent from the following drawings, detailed description, and claims, all of which illustrate the principles of the invention, by way of example only.

BRIEF DESCRIPTION OF THE DRAWINGS

A more complete appreciation of the invention and many attendant advantages thereof will be readily obtained as the same becomes better understood by reference to the following detailed description when considered in connection with the accompanying drawings. In the drawings, like reference characters generally refer to the same parts throughout the different views. Further, the drawings are not necessarily to scale, with emphasis instead generally being placed upon illustrating the principles of the invention.

DETAILED DESCRIPTION

Figure 1:
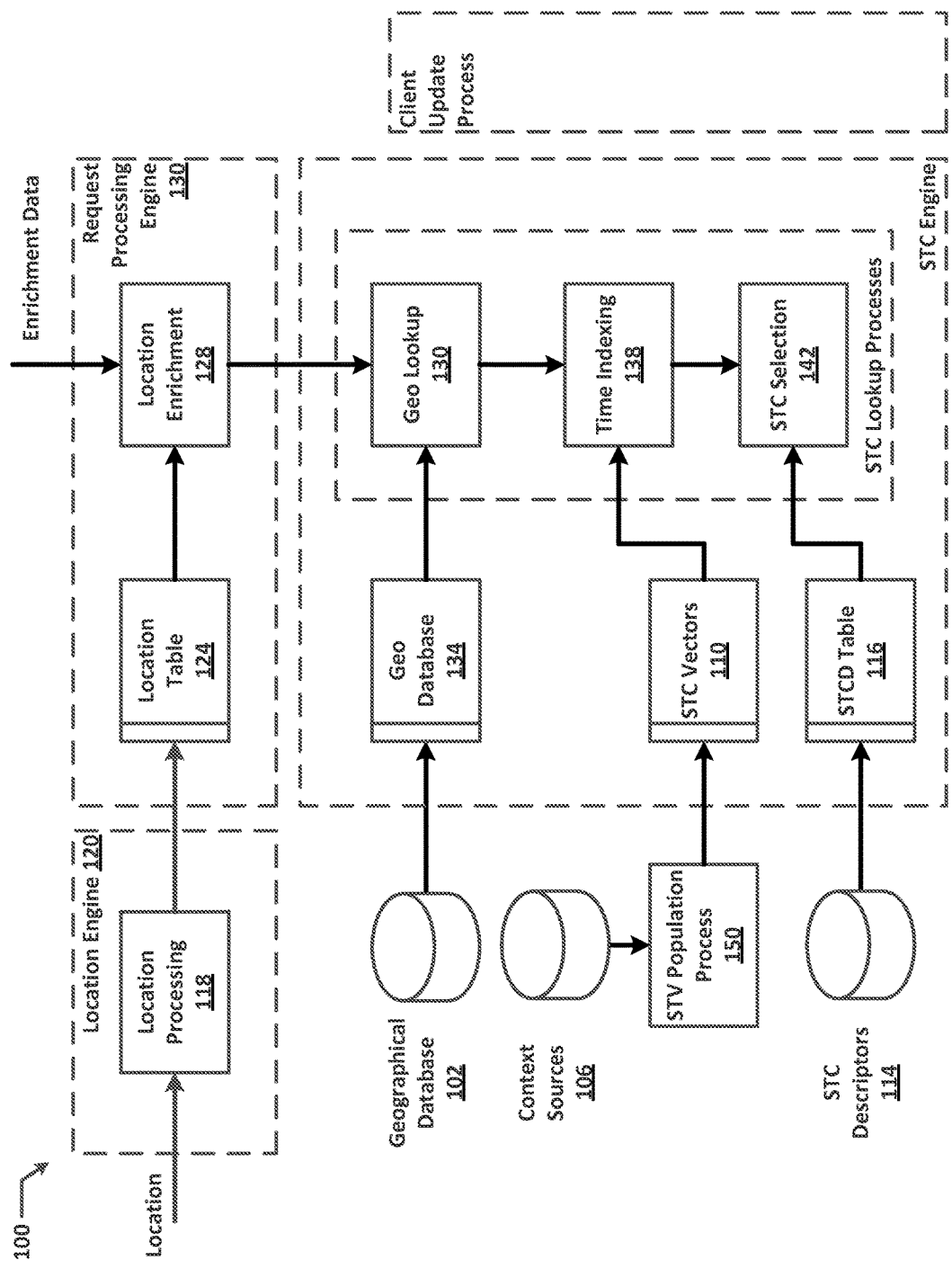
FIG. 1 is an example high-level system architecture diagram according to an implementation of the invention.

Described herein are various implementations of methods and systems that define a user's situational context as a function of space and time, detect the user context in real time, and allow third-party applications to utilize the context without violating consumer privacy.

Although the drawings depict components as functionally separate, such depiction is merely for illustrative purposes. It will be apparent that the components portrayed in the figures can be arbitrarily combined or divided into separate software, firmware and/or hardware components. Furthermore, it will also be apparent that such components, regardless of how they are combined or divided, can execute on the same host or multiple hosts, and multiple hosts can be connected by one or more networks.

As used herein, the term engine refers to software, firmware, hardware, or other component that is used to effectuate a purpose. The engine will typically include software instructions that are stored in non-volatile memory (also referred to as secondary memory). When the software instructions are executed, at least a subset of the software instructions is loaded into memory (also referred to as primary memory) by a processor. The processor then executes the software instructions in memory. The processor may be a shared processor, a dedicated processor, or a combination of shared or dedicated processors. A typical program will include calls to hardware components (such as input/output devices), which typically requires the execution of drivers. The drivers may or may not be considered part of the engine, but the distinction is not critical.

As used herein, the term database is used broadly to include any known or convenient means for storing data, whether centralized or distributed, relational or otherwise.

As used herein, the term mobile device can be, but is not limited to, a cell phone, such as the Apple® iPhone®, other portable electronic devices, such as the Apple® iPod Touch®, Apple® iPads®, and mobile devices based on the Google® Android® operating system, and any other portable electronic device that includes software, firmware, hardware, or a combination thereof. Typical components of the mobile device may include, but are not limited to, persistent memories like flash ROM, random access memory like SRAM, a camera, a battery, an LCD driver, a display, a cellular antenna, a speaker, a Bluetooth circuit, and WIFI circuitry, where the persistent memory may contain programs, applications, and/or an operating system for the mobile device.

It should also be noted that implementations of the present techniques can be provided as one or more computer-readable programs embodied on or in one or more articles of manufacture. The article of manufacture can be any suitable hardware apparatus, such as, for example, a floppy disk, a hard disk, a CD-ROM, a CD-RW, a CD-R, a DVD-ROM, a DVD-RW, a DVD-R, a flash memory card, a PROM, a RAM, a ROM, or a magnetic tape. In general, the computer-readable programs can be implemented in any programming language. The software programs can be further translated into machine language or virtual machine instructions and stored in a program file in that form. The program file can then be stored on or in one or more of the articles of manufacture.

FIG. 1 illustrates an overall system architecture of one implementation of a system 100. System 100 can be utilized in a variety of applications using or interested in a mobile user's immediate situational context derived from the location of the mobile user device associated with the mobile user, including, but not limited to, advertising, social mobile applications, coupon systems, news, mobile search and the like. In one embodiment, the system 100 provides Space-Time Contexts ("STCs"). An STC is a characteristic describing the situational environment of a mobile user device as a function of its immediate location and time, and defining the areas of relevancy for a variety of purposes. "Location" can refer to a geographical area, such as a defined circular or polygonal geographical region, or a geographical entity, such as a business, building, neighborhood, campus, district, city, state, country, and the like. "Time" can refer to a time of day, a date, a day of the week, a week, a month, a year, a time zone, a holiday, a season, a period of time, and so on. In one implementation, STCs are used for targeted advertising.

Each STC is associated with a particular real-life situational context, and can be as broad as "Business," "Education," and "Family," or as narrow as "Family Dinner," "Business Lunch," "Office Hours," "Happy Hour Drinks," "Weekend Sports," "Family Outing," and the like. Contexts can be uniquely identified by numeric values (i.e., a "Context ID") that are structured as a hierarchy, with each level of the hierarchy representing a different level of specificity of the contexts.

Within system 100, each context is defined using a Space-Time Context Descriptor (STCD) that is instantiated for each major geography or country. As non-limiting examples, these geographies can be North America, Japan, and South-East Asia. Each STCD can also include the following parameters: (i) Context ID: an integer uniquely identifying a particular STC associated with the STCD; (ii) Geo ID: a geographical area associated with the STCD; and (iii) Name: a text string defining the name associated with the STC, e.g., "Family Dinner."

The system 100 can also include additional application-specific parameters in an STCD structure. For example, for a mobile advertising application the system 100 can include: (i) Default Floor Price: the minimum price associated with the STC, for the purpose of using context for mobile advertising through real-time bidding (ad inventory associated with this STC is not sold at a price lower than its floor price, minus any special discounts applicable to the bidder); and (ii) Stat Info: a data structure containing statistical information related to the context, e.g., weighted average win price, contention levels, number of impressions served within particular time periods, which can be, as non-limiting examples, last day, last hour, last minute and the like.

In one implementation, system 100 includes the following components:

Geographical Database 102: This database 102 includes a set of polygons with associated attributes distributed across multiple levels of hierarchy. Each polygon can represent a geographical area or entity, such as a building, group of buildings, city block, city district, city, and so on.

Context Sources Database 106: This database 106 includes a set of STC Descriptors, each representing an instance of an STC within a specific geography, such as country or city.

STC Vectors 110: Time-indexed arrays, each associated with a single polygon or a group of polygons, and containing references to one or more STC Descriptors 114.

Optional User Location Database: This database is utilized to obtain mobile user location through, e.g., integration with a mobile carrier network.

When an application is interested in obtaining a context (STC) associated with a specific user of a mobile device, it can send a request to the system 100 specifying the user's ID (which can be depersonalized and anonymized by the system for privacy reasons). An application can also use the system 100 in a subscription type of service, in which an application instructs the system 100 to send a notification when a user's mobile device enters a specific set of STCs. When sending a response or a notification to an application, the system 100 can include only a set of active Context IDs associated with a mobile user device, rather than providing the precise coordinates of the device, thus avoiding consumer privacy issues.

The set of STCs associated with a mobile device user is a function of the mobile device user's location and a time associated with the location, such as the approximate current time (STCLoc=f(Loc, time)). In the case of mobile advertising, for example, the time can be the time of receipt of a request for an ad to be served to the mobile user device. Within a particular location, a set of STCs associated with the location is represented as a STC Vector (STCV), which, by using time as a parameter, allows the system 100 to deterministically identify the context of a specific location (and users within it) at a particular moment in time (STCLoc=fLoc(time)).

The STCs (represented by STCDs 114) and STCVs 110 can be provisioned in a non-real time manner. A system administrator can create and periodically update a set of STCDs 114 based on an analysis of the statistical data produced by the system 100 that reflects users' activity related to specific geographical areas, days of the week, and time of day, as well as interest and recommendations from advertisers. In other implementations, the creation and/or updating of STCDs 114 is automatically performed in whole or in part, and/or in real-time. The STCVs 110 are then populated by the STCV Population Process 150 that uses a set of rules that can be defined by the administrator. As a non-limiting example, rules can consider statistical distribution of places of different categories (e.g., a point-of-interest database obtained from third party sources) within a particular polygon, and construct the STC vector for the polygon based on the dominant categories. For example, if the polygon's dominant place category is residential, the constructed STC Vector may include a reference to a "Family Breakfast" STC for the 7 am-9 am time frame, and a "Family Dinner" STC for the 6 pm-9 pm time frame.

The STC Population Process 150 can take into consideration different types of data to generate STCVs 110. For example, the motion activity of the users on a mobile carrier network can be monitored to statistically detect venue types. As another example, the social networking activity of a large variety of users can be monitored within particular locations.

An application can use the STCs reported by the system 100 as a representation of different real-life situational contexts, and as a more scalable and privacy-friendly alternative to tracking a user's location or requesting the location from the carrier. As a non-limiting example, an application may be interested in providing a mobile user certain information whenever the user is in the context of "Business" or in the context of "Family Dinner." The application can periodically request the system 100 to check the user's current context, or request the system 100 to send a notification when the user is in either of the above two contexts. When the user is in the location and time slot corresponding to the "Business" or "Family Dinner" context (e.g., in an office center at 3 pm, or in a residential area at 8 pm, respectively), the system 100 can notify the application without disclosing the user's identity or location.

Figure 2:
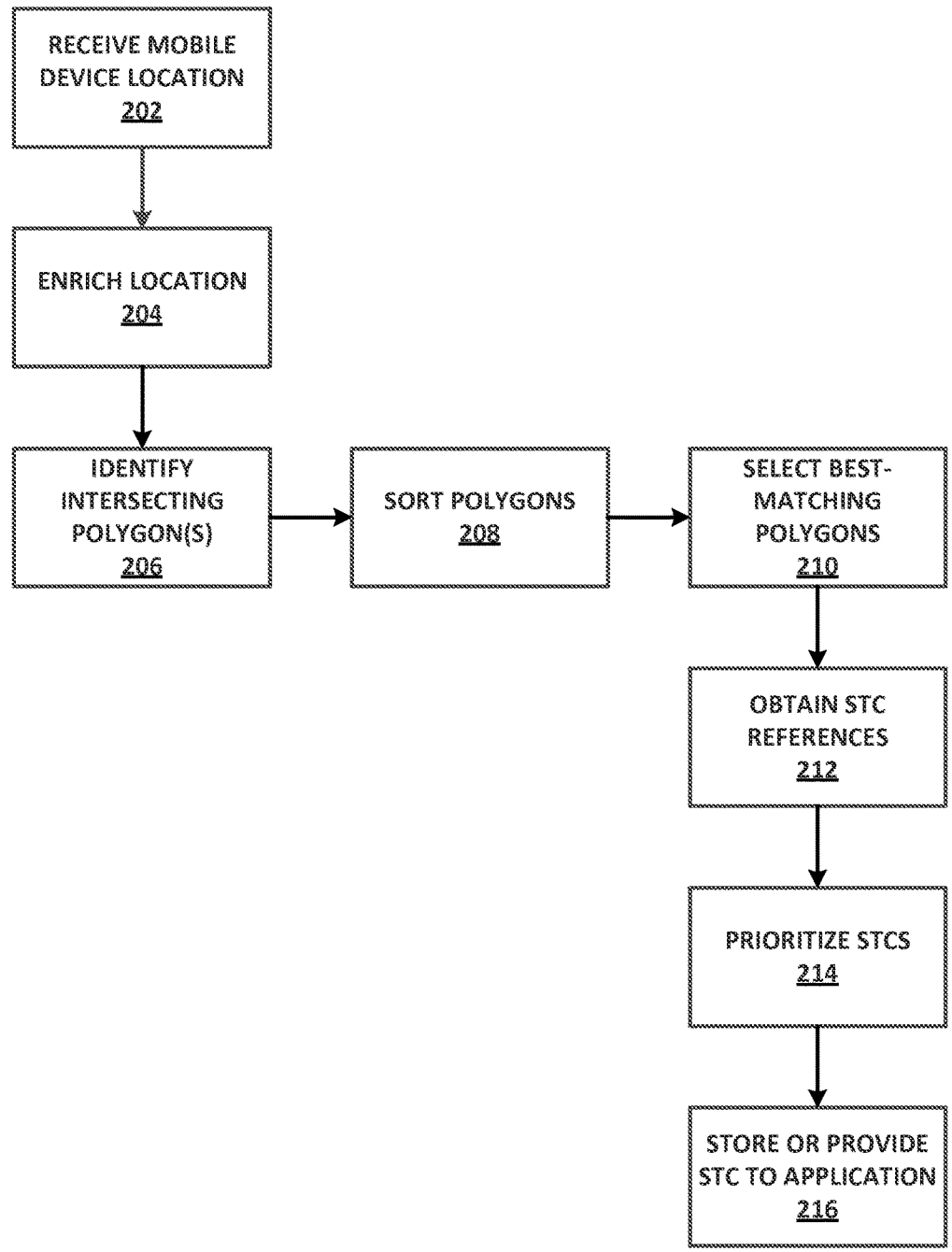
FIG. 2 is an example flowchart of a method for detecting a space-time context according to an implementation of the invention.

In one implementation, an STC Detection algorithm is invoked either upon an update of a particular mobile user's location or at the request of an application, and proceeds as depicted in FIG. 2, using the system implementation shown in FIG. 1. In STEP 202, the location of the mobile user device is received and processed by the Location Processing module 118 of the Location Engine 120. The received mobile user device location is stored in the Location Table 124 and can be "enriched" by the Location Enrichment module 128 of the Request Processing Engine 130 (STEP 204). For example, if the STC Detection algorithm is invoked at the request of an application, it is likely that the application cannot provide the location information of the mobile user device. In this situation, the system 100 can enrich the request with location enrichment data received from, e.g., the mobile carrier network. In some implementations, the system 100 is hosted within the mobile carrier's environment in order to facilitate this data transfer.

Following STEP 204, the system 100 has the mobile user device location represented as a location circle with the latitude and longitude of the center and a precision radius, which can vary depending on whether location data is received from a WIFI, 3G, or 4G network, or from GPS on the device itself. In STEP 206, using the location circle as a parameter, the system 100 performs a geographical lookup in the Geo Database 134, using the Geo Lookup module 130, to identify a set of polygons at different levels of a hierarchy. The result of the lookup operation is a set of polygons that intersect at least in part with the location circle. The identified polygons can then be sorted (STEP 208) by relevance such that polygons that are too big or too small compared to the location circle, or those whose intersection areas are very small, are less preferred. As a non-limiting example, the system 100 can use the ratio of the area of intersection of the circle and the polygon to the area of the union of the two as the sorting parameter. Finally, the system 100 selects a small number of polygons (e.g., 1, 2, 3, 5, etc.) at the top of the sorted list as best matching (STEP 210).

In STEP 212, the system 100 obtains a set of STC Vectors 110 that is associated with the best matching polygons and, with the Time Indexing module 138, indexes within them using the mobile device user's day of week and time of day as a parameter (although in other implementations, other time parameters can be used, such as only time of day or date). As a result of this operation, the system 100 obtains a set of STC references associated with the polygons and time parameters.

In STEP 214, the system 100 may further prioritize STCs obtained in the previous step and select one or more best-matching STCs using the STC Selection module 142 and STCDs 114 from the in-memory STCD Table 116. The STC can then be stored in the system 100 and/or sent to application(s) interested in the context of a mobile device user associated with the selected STC(s) (STEP 216). New STCs can also be cached by the system 100 for faster STC detection in the future.

In one implementation, the STC mechanisms described herein can be utilized in a mobile ad targeting architecture integrated with a mobile carrier. In addition to the previously described components, the system 100 includes an ad campaign database. Among other parameters, including but not limited to geographical and demographical filters, each ad campaign has one or more STCs associated with it that are specified by an ad manager at the time the campaign is created. Specifying the set of STCs helps to avoid requiring the ad manager to provision a large number of specific polygons associated with a particular context, and allows the system to perform context detection in real-time by matching the context of the polygons to the context of ad campaigns.

When the system 100 receives an ad or bid request, it uses its in-memory Geo Database 134 to dynamically identify in real-time one or more STCs that the mobile user is currently associated with. The system 100 detects the mobile user's current STC based on the immediate location and time, and dynamically selects relevant ad campaigns at the time of processing of the received ad or bid request. When an ad request is received, the system 100 identifies the location circle incorporating the location of the mobile user device. As a non-limiting example, this can be a central point plus radius corresponding to a 2G/3G base station or WIFI access point, GPS coordinates from the device itself submitted within the ad request, or a 4G location circle. This is achieved, for example, by looking up the Cell-10 or BSSID in the system's network database, or sending a real-time request to a dedicated location engine.

System 100 then performs a best-match lookup within the Geographical Database 134 to identify a set of polygons that intersect with the location circle. Returned polygons can be sorted in the order of the degree of geographical match, reflecting the size of the location circle, the intersecting polygon, and the size of the intersecting area. Among the total set of matching polygons, the system 100 uses the three best matching polygons to detect the set of STCs associated with the mobile user as follows. Each polygon has an STCV associated with it. Using the mobile user's current day of week and time of day as an index, the system 100 takes one STC value from the STCV of each polygon, and builds the mobile user's Current STC Set (CSTCS).

Besides the best-matching polygons, the geo lookup can also return one or more fully-enclosing polygons (e.g., city, county, state, country, etc.) that are used by the advertisers to define the scope of their ads and have one or more ad campaigns linked to them. These are the ad campaigns that match the geographical scope but need to be further qualified to make sure they match the CSTCS.

Among all campaigns potentially applicable to the current location, the system 100 selects only those that apply given the CSTCS of the mobile user. This step is performed by examining the campaign's Target STC Set (TSTCS) and performing a logical AND operation against the CSTCS. If the resulting set is non-empty, one of the campaign's target STCs has been matched. The campaign therefore qualifies to further compete for the impressions and proceeds to the bidding part of the algorithm, and the corresponding intersection of TSTCS and CSTCS are added to the Active STC Set (ASTCS), which is unique for every given ad/bid request.

For each of the STCs in the ASTCS, the system 100 tracks and sorts STCs according to the following parameters: (i) the Floor Price, found in the corresponding STCD; and (ii) the highest possible bid, i.e. the highest maximum bid among all qualifying and active campaigns should they bid against this specific STC. For the purpose of bidding, any particular impression can only be associated with a single STC. However, during the previous steps of the algorithm, the system 100 may have identified more than one STC that intersects the campaign's Target STC Set and the mobile user's Current STC Set, i.e., the ASTCS. To select the Bidding STC (BSTC), the system 100 takes the highest ranked STC within ASTCS, which will be the STC with the highest floor price and the highest possible bid.

Certain implementations of the present invention were described above. It is, however, expressly noted that the present invention is not limited to those implementations, but rather the intention is that additions and modifications to what was expressly described herein are also included within the scope of the invention. Moreover, it is to be understood that the features of the various implementations described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A computer-implemented method comprising:
storing, in computer memory, a plurality of space-time contexts (STCs), each STC comprising a situational environment as a function of location and time;
storing, in the computer memory, information defining a plurality of polygons, each polygon representing at least one of a geographical entity and a geographical area;
associating a mobile user device with at least one of the STCs by:
receiving a location of the mobile user device, the location comprising information defining a geographic shape containing the mobile user device;
identifying a sub-plurality of the polygons each containing at least a portion of the location of the mobile user device;
ranking the sub-plurality of polygons according to relevance to the mobile user device, wherein the ranking comprises identifying as preferable or not preferable each polygon in the sub-plurality of polygons based on at least one of (i) a size of the polygon relative to a size of the geographic shape containing the mobile user device and (ii) a size of an area of intersection between the polygon and the geographic shape containing the mobile user device;
identifying a set of STCs for each high-ranking polygon; and
selecting, based on a time associated with the mobile user device, at least one STC from the sets of STCs to be associated with the mobile user device; and
providing the at least one associated STC to an application.

2. The method of claim 1, wherein the association is based on at least one of a current location of the mobile user device and a current time.

3. The method of claim 1, wherein the location of the mobile user device is obtained from a mobile carrier network.

4. The method of claim 1, further comprising storing, in the computer memory, a plurality of STC descriptors, each STC descriptor comprising an instance of an STC associated with at least one of the polygons.

5. The method of claim 4, further comprising creating and updating the STC descriptors based on statistical data reflecting mobile user activity: (a) within specific geographical areas, and (b) during specific times.

6. The method of claim 1, further comprising receiving, from the application, a request for an STC associated with the mobile user device.

7. The method of claim 1, further comprising receiving, from the application, a request to be provided with a notification upon the mobile user device becoming associated with at least one of the STCs.

8. The method of claim 1, further comprising selecting an advertisement to be served to the mobile user device based on the at least one associated STC.

9. The method of claim 1, further comprising storing, in the computer memory, a hierarchical structure of the plurality of STCs, wherein increasing levels of the hierarchical structure comprise increasing levels of specificity of the plurality of STCs.

10. The method of claim 1, further comprising receiving a selection of one or more of the STCs to target an audience for an advertising campaign.

11. A system comprising:
at least one memory for storing computer-executable instructions; and
at least one processing unit for executing the instructions stored on the memory, wherein execution of the instructions configures the at least one processing unit to perform operations comprising:
storing, in computer memory, a plurality of space-time contexts (STCs), each STC comprising a situational environment as a function of location and time;
storing, in the computer memory, information defining a plurality of polygons, each polygon representing at least one of a geographical entity and a geographical area;
associating a mobile user device with at least one of the STCs by:
receiving a location of the mobile user device, the location comprising information defining a geographic shape containing the mobile user device;
identifying a sub-plurality of the polygons each containing at least a portion of the location of the mobile user device;
ranking the sub-plurality of polygons according to relevance to the mobile user device, wherein the ranking comprises identifying as preferable or not preferable each polygon in the sub-plurality of polygons based on at least one of (i) a size of the polygon relative to a size of the geographic shape containing the mobile user device and (ii) a size of an area of intersection between the polygon and the geographic shape containing the mobile user device;
identifying a set of STCs for each high-ranking polygon; and
selecting, based on a time associated with the mobile user device, at least one STC from the sets of STCs to be associated with the mobile user device; and
providing the at least one associated STC to an application.

12. The system of claim 11, wherein the association is based on at least one of a current location of the mobile user device and a current time.

13. The system of claim 11, wherein the location of the mobile user device is obtained from a mobile carrier network.

14. The system of claim 11, wherein the operations further comprise storing, in the computer memory, a plurality of STC descriptors, each STC descriptor comprising an instance of an STC associated with at least one of the polygons.

15. The system of claim 14, wherein the operations further comprise creating and updating the STC descriptors based on statistical data reflecting mobile user activity: (a) within specific geographical areas, and (b) during specific times.

16. The system of claim 11, wherein the operations further comprise receiving, from the application, a request for an STC associated with the mobile user device.

17. The system of claim 11, wherein the operations further comprise receiving, from the application, a request to be provided with a notification upon the mobile user device becoming associated with at least one of the STCs.

18. The system of claim 11, wherein the operations further comprise selecting an advertisement to be served to the mobile user device based on the at least one associated STC.

19. The system of claim 11, wherein the operations further comprise storing, in the computer memory, a hierarchical structure of the plurality of STCs, wherein increasing levels of the hierarchical structure comprise increasing levels of specificity of the plurality of STCs.

20. The method of claim 10, further comprising enhancing the targeting of the audience by reducing the selection of STCs based on the at least one associated STC.

* * * * *